Figures 1, 2:
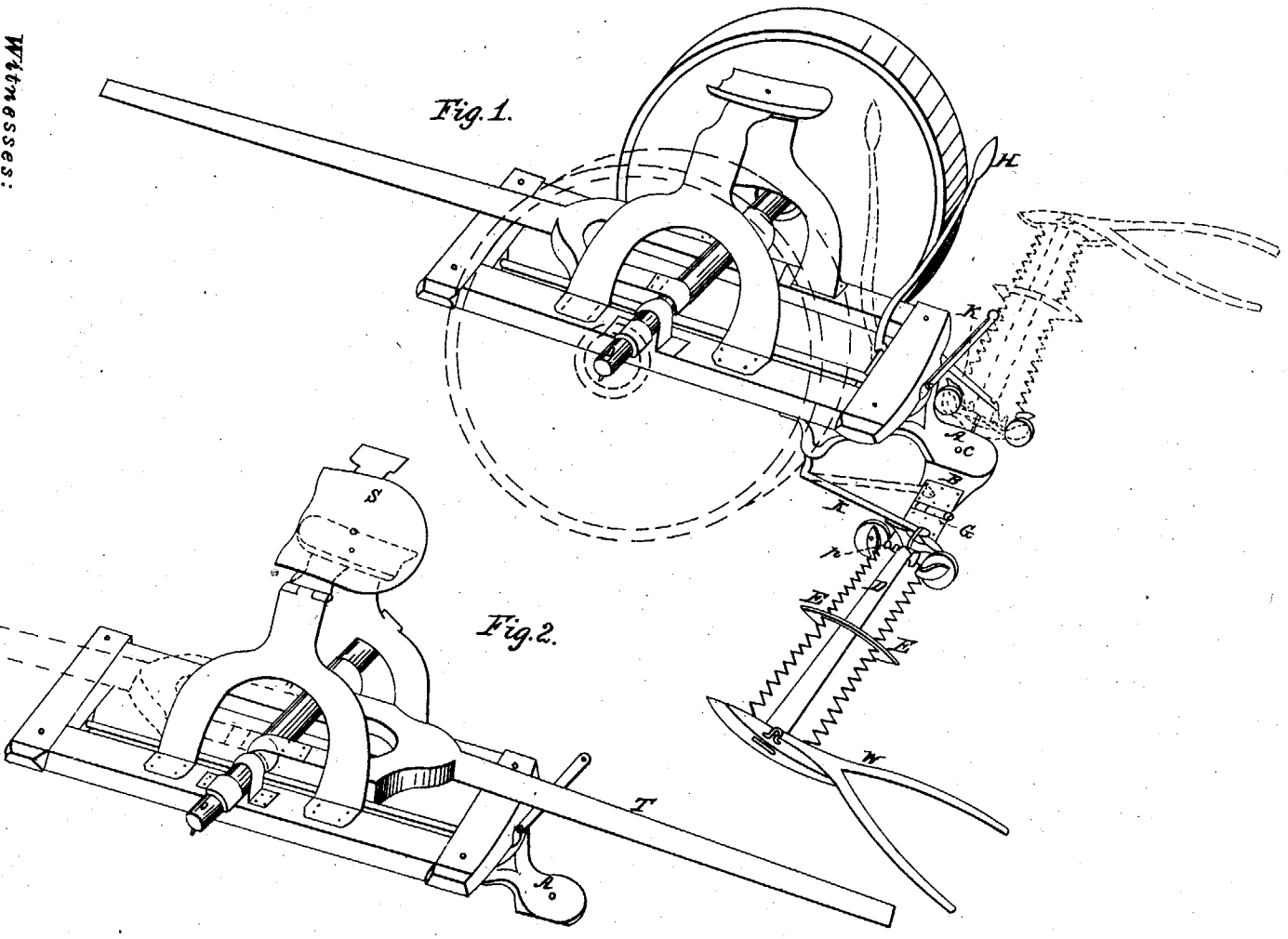

H. L. HOPKINS.

Harvester.

No. 2,664. Reissued July 2, 1867.

Witnesses:
A. M. Morse
Gardner Morse

Inventor:
Harvey L. Hopkins

N. PETERS, Photo-Lithographer, Washington, D. C.

UNITED STATES PATENT OFFICE.

HARVEY L. HOPKINS, OF EATON, NEW YORK.

IMPROVEMENT IN HARVESTERS.

Specification forming part of Letters Patent No. 33,943, dated December 17, 1861; reissue No. 2,664, dated July 2, 1867.

*To all whom it may concern:*

Be it known that I, HARVEY L. HOPKINS, of Eaton, in the county of Madison and State of New York, have invented new and useful Improvements in Grass and Grain Cutting Machines; and I do hereby declare that the following is a full, clear, and exact description thereof, reference being had to the accompanying drawings, and to the letters of reference marked thereon, in which—

Figure 1 is a perspective view, with one of the wheels removed. Fig. 2 represents the frame, tongue, and driver's seat, &c.

My improvements consist in a new and useful mode of connecting the rack or finger bar to the main frame of the machine, so as to admit of its being turned horizontally from one side of the frame to the other or opposite side, &c.; and also in a new and useful mode of supporting the rack or finger bar on either side of the frame, by means of a device which may at pleasure be employed to elevate and control the position of said rack or finger bar from the driver's seat; and my improvement further consists in so connecting the driver's seat to the frame of the machine that said seat may be turned upward upon a joint in such a manner as to allow the tongue to be turned over upon its pivoted connection, for the purpose of drawing the machine in either direction; and a finger-bar provided with two sets of cutters, one of which projects forward and the other rearward, all of which will be presently described. The frame and supporting-wheel, also the mode of communicating motion to the cutters are, in all respects, like those now in common use, and therefore will not require description.

Under the main frame, and at or near one end thereof, I bolt a strong casting, marked A in the drawings. To the under side of said casting I connect an arm or coupling-piece, marked B, by means of a strong bolt. (Shown at C at this point.) The coupling-piece is allowed to turn freely on its pivoted connections. D represents the rack or finger bar, which is provided with two cutters and guard-fingers, projecting forward and backward, E and F; also, a track-scraper, W, so connected to the outer shoe that it may be turned to either side. G represents a joint in the coupling-piece, by means of which the rack or bar may be turned up into a position that will allow it to rest upon the frame in rear, or at the side thereof. H represents a hand-lever, within convenient reach of the driver's seat. Said lever is connected to a strong bar of iron, marked *i i*. Said bar extends across the frame of the machine, and is supported by hangers, one of which is not shown in the drawing. It is arranged, however, like the one shown at *j*, and located in under the opposite cross-piece of the frame. Said bar is provided with angular ends K K. Connected with the coupling-piece hereinbefore mentioned is a loop or eye, marked L. In said loop in a spring, *m*. On the upper side of bars K K is a notch or depression. When the finger-bar is at right angle with the frame of the machine, the notch or depression is designed to connect with the upper part of loop L, and is held in that position by spring *m*. By this arrangement the finger-bar is supported and drawn forward.

By means of hand-lever H and its connections, the finger-bar may be elevated from the ground, and held in any desired position above the ground by the seated driver—it matters not from which side of the machine said finger-bar projects. By this arrangement my improved harvester may be used with the cutting apparatus on either side of the main frame of the machine, allowing the operator to continue the harvest from one side of the field, or to move with the finger-bar or cutting apparatus on either side of the main frame of the machine, as circumstances may require.

To enable the tongue to be reversed, the seat S is hinged to the standard upon which it is supported on one side, so that it may be turned up to permit the tongue, in swinging over, to pass the seat, and to enable the driver to drive with the machine, traveling with either end in front. The seat is set upon a pivot, upon which it may be turned horizontally revolving upon the pivot. The seat S, Fig. 2, is represented turned upward by full lines, so as to allow the tongue T to be turned over into position. (Shown in dotted lines.) By this arrangement my improved harvester may be used with the cutting apparatus in advance or in rear of the driving or supporting wheels, it matters not from which side of the main frame it may project.

Having described my improvement, what I claim therein, and desire to secure by Letters Patent, is—

1. Combining with the frame of a harvester a finger-bar, which may be turned horizontally upon its pivoted connection from one side of the frame to the opposite side, substantially as described.

2. Combining with said finger-bar an elevating and supporting apparatus, so arranged as to perform the same service, whether the finger-bar projects to the right or left of the main frame, substantially as represented and described.

3. A reversible pole or tongue, for the purpose of drawing the machine in either direction, substantially as described.

4. A driver's seat, which may be reversed to accommodate the operator, substantially as and for the purpose set forth.

In testimony whereof I have signed my name to this specification before two subscribing witnesses.

HARVEY L. HOPKINS.

Witnesses:

JOHN S. HOLLINGSHEAD,

A. L. NEWTON.